(12) United States Patent
Seid

(10) Patent No.: US 6,179,268 B1
(45) Date of Patent: *Jan. 30, 2001

(54) PROPORTIONAL VARIABLE FORCE SOLENOID CONTROL VALVE WITH SEGMENTED PERMANENT MAGNET

(75) Inventor: David L. Seid, North Muskegon, MI (US)

(73) Assignee: Saturn Electronics & Engineering, Inc., Auburn Hills, MI (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/063,963

(22) Filed: Apr. 21, 1998

(51) Int. Cl.$^7$ ............................................ F16K 31/08
(52) U.S. Cl. .......................... 251/65; 251/129.08; 335/229
(58) Field of Search ............................. 251/65, 129.08; 335/229, 230, 231, 232, 233, 234

(56) References Cited

U.S. PATENT DOCUMENTS

| | | | |
|---|---|---|---|
| 3,977,436 | * 8/1976 | Larner | 251/65 X |
| 4,217,507 | * 8/1980 | Jaffe et al. | 335/229 X |
| 4,534,539 | * 8/1985 | Dettmann | 251/65 |
| 4,946,009 | * 8/1990 | Knutson | 251/129.05 |
| 4,988,074 | 1/1991 | Najmolhoda | 251/129.08 |
| 5,488,260 | * 1/1996 | Heyraud | 335/296 X |
| 5,611,370 | 3/1997 | Najmolhoda | 137/625.61 |
| 5,661,446 | * 8/1997 | Anderson et al. | 335/179 X |
| 5,845,667 | * 12/1998 | Najmolhoda et al. | 137/1 |

* cited by examiner

Primary Examiner—Kevin Shaver
Assistant Examiner—John Bastianelli (57) ABSTRACT

A proportional variable force solenoid fluid control valve for controlling the pressure of a pressurized fluid in a fluid control system in proportion to the current level of an electrical input signal includes an armature in engagement with a fluid pressure control valve and movable in response to electrical current applied to a solenoid disposed on a coil bobbin in a solenoid housing and a coil spring for biasing the armature in a direction to establish a valve fluid pressure response to current level supplied to the solenoid. A plurality of axially magnetized permanent magnet segments each having an inner arcuate magnet surface facing the armature are provided to collectively provide a permanent magnetic field that cooperates with the electromagnetic field of the energized coil to move the armature. The permanent magnet segments are disposed in a circular array about the periphery of the armature in respective circumferentially spaced apart, axially extending pockets of the coil bobbin in a common transverse plane relative to the longitudinal axis of movement of the armature. The magnet segments are selected in number and arcuate surface extent to collectively encompass or overlie less than 100% of the peripheral surface of the armature when viewed in cross-section transverse to the longitudinal axis.

25 Claims, 4 Drawing Sheets

PROPORTIONAL VARIABLE FORCE SOLENOID CONTROL VALVE WITH SEGMENTED PERMANENT MAGNET

FIELD OF THE INVENTION

The present invention relates to a proportional variable force solenoid operated valve that controls fluid pressure in response to electrical current applied to a valve solenoid and, more particularly, to a proportional variable force solenoid operated valve having permanent magnet segments disposed in pockets in a coil bobbin.

BACKGROUND OF THE INVENTION

A proportional variable force solenoid control valve that is relative low in cost to manufacture and compact in size while maintaining substantially linear proportional fluid control is described in the Najmolhoda U.S. Pat. No. 4,988,074 issued Jan. 29, 1991, of common assignee herewith. The patented proportional variable force solenoid control valve comprises an outer steel solenoid housing and an aluminum valve member housing joined together mechanically such as by tabs on the steel solenoid housing being crimped about regions of the aluminum valve member housing.

The proportional variable force control valve includes a ferromagnetic (e.g. steel) armature suspended by low spring rate springs at opposite ends of the armature within the bore hole of a coreless solenoid bobbin for reciprocable movement between positions corresponding to a closed valve position and fully open valve position in response to applied electrical current to an electromagetic coil. The position of the armature is controlled by balancing the variable force of an electromagnetic field of an electromagnetic coil and the force of the magnetic field of a one-piece permanent ring magnet against the force of a compression coil spring which biases the valve toward the closed position of the valve. The electromagnetic coil, bobbin and armature reside in the steel solenoid housing in a manner that the steel housing provides a concentration of flux of the electromagnetic field at the armature. The permanent ring magnet is heat staked in position on the coil bobbin. The fluid control valve on the end of the armature moves relative to a valve seat disposed in the aluminum valve housing to communicate a fluid inlet to fluid exhaust ports so as to regulate fluid pressure at fluid control ports in a manner proportional to the magnitude of applied electrical current.

A commercially manufactured version of the aforementioned patented proportional variable force solenoid fluid control valve has been modified to include a stainless steel ball valve and a separate stainless steel valve seat insert pressed in the nozzle. The ball valve is captured in a stainless steel cage between the valve seat and a rod-like, cylindrical shaped steel armature that moves relative to the valve seat in a manner proportional to the magnitude of electrical current applied to the electromagnetic coil. As the armature moves relative to the valve seat to actuate the valve, the ball valve is caused to follow the end of the armature by virtue of fluid pressure in the valve member housing and confinement in the ball valve cage in the bobbin. The fluid inlet is communicated to fluid exhaust ports by opening of the ball valve so as to regulate fluid pressure at fluid control ports in a manner proportional to the magnitude of electrical current applied to the coil.

A spool valve is disposed in the valve member housing for providing a two stage, high flow capability wherein pressurized fluid supplied to the inlet port initially is directed to bypass the control ports and flows to an end of the spool valve to move it from a zero fluid flow spool position to a maximum fluid flow spool position relative to the control ports as determined by the cracking pressure preset for the ball valve by adjustment of the coil spring force. Thereafter, a second stage of operation involves controlling the fluid flow through the control ports by moving the spool valve between minimum and maximum flow spool positions in a manner proportional to the magnitude of electrical current to the coil. Such proportional variable force solenoid control valves commercially manufactured to-date are operably mounted to a cast aluminum transmission body or case by a clamp plate, bolt, or both engaging an outer nozzle groove.

The Najmolhoda U.S. Pat. No. 5,611,370 issued Mar. 18, 1997, also describes a proportional variable force solenoid control valve that includes a substantially non-magnetic common housing for the solenoid and control valve, simplfying valve manufacture and construction while maintaining substantially linear proportional fluid pressure control.

An object of the present invention is to provide a proportional variable force solenoid fluid control valve having multiple permanent magnet segments received in pockets of the coil bobbin to simplify construction and lower cost of the control valve.

SUMMARY OF THE INVENTION

The present invention provides a proportional variable force solenoid fluid control valve for controlling the pressure of a pressurized fluid in a fluid control system in proportion to the current level of an electrical input signal. In one embodiment of the present invention, the proportional variable force solenoid fluid control valve comprises an armature in engagement with a fluid pressure control valve and movable in response to electrical current applied to a solenoid disposed on a coil bobbin in a solenoid housing and means for biasing the armature in a direction to establish a valve fluid pressure response to current level supplied to the solenoid (i.e. fluid pressure versus solenoid current). A plurality of axially magnetized permanent magnet segments each having an inner arcuate magnet surface facing the armature are provided to collectively provide a permanent magnetic field that cooperates with the electromagnetic field of the energized coil to move the armature. The permanent magnet segments are disposed in a circular array about the periphery of the armature in respective circumferentially spaced apart, axially extending pockets of the coil bobbin in a common transverse plane relative to the longitudinal axis of movement of the armature. The magnet segments are selected in number and arcuate surface extent to collectively encompass or overlie less than 100% of the peripheral surface of the armature when viewed in cross-section transverse to the longitudinal axis. Preferably, inner arcuate surfaces of the permanent magnet segments collectively encompass at least about 67%, preferably about 70% to about 80%, of the peripheral surface of the armature when viewed in transverse cross-section.

In one particular embodiment of the present invention, each permanent magnet segment includes an inner arcuate surface facing the armature and an outer arcuate surface to form a generally C-shaped magent segment. Each magnet segment includes axial side faces with each segment axially magnetized between the side faces and radially extending end faces that are cicumferentially spaced from the end faces of an adjacent magnet segment. When viewed in transverse cross-section, the end faces of the permanent magnet segment are disposed in radial planes that intersect the center of a cylindrical armature.

The coil bobbin of an embodiment of the invention includes respective axially extending pockets to receive each permanent magnet segment with the axial side faces oriented generally perpendicular to the longitudinal axis of movement of the armature. Each pocket is defined by an inner arcuate opening, an outer arcuate wall and radially extending end walls to this end. Each pocket includes an open outer end through which a respective magnet segment is inserted into the pocket and an inner end closed by an axial pocket wall extending generally perpendicualr to the longiudinal axis. Each magnet segment is confined in its own pocket and separated from adjacent magnet segments by the end walls of the pocket and from the armature by the inner arcuate opening of the pocket. Each magnet segment preferably is frictionally confined in each pocket by, for example, the radially extending end faces of the magnet segment frictionally engaging axially extending locating posts provided in each pocket proximate the outer arcuate surface and radially extending end walls when the segment is inserted into the pocket. A recess in the axial wall of each pocket disposed behind the magnet segment is provided to receive plastic shavings that are removed from the locating post as each magnet segment is frictionally inserted into each pocket so that the shavings do not mis-orient the magnet segment in the pocket.

The present invention is advantageous in that use of multiple arcuate permanent segments reduces the amount of costly permanent magnet material required and renders fabrication of the permanent magnet component easier and less costly, without adversely affecting operation of the control valve by proper control of magent segment number and configuration. Moreover, assembly of the permanent magnet segments in respective pockets of the coil bobbin simplfies construction and assembly of the control valve and reduces complexity of heat stacking of the segments in the pockets.

The foregoing and other objects, features, and advantages of the invention wll become apparent from the following more detailed description taken with the accompanying following drawings.

DESCRIPTION OF THE INVENTION

Figure 1:
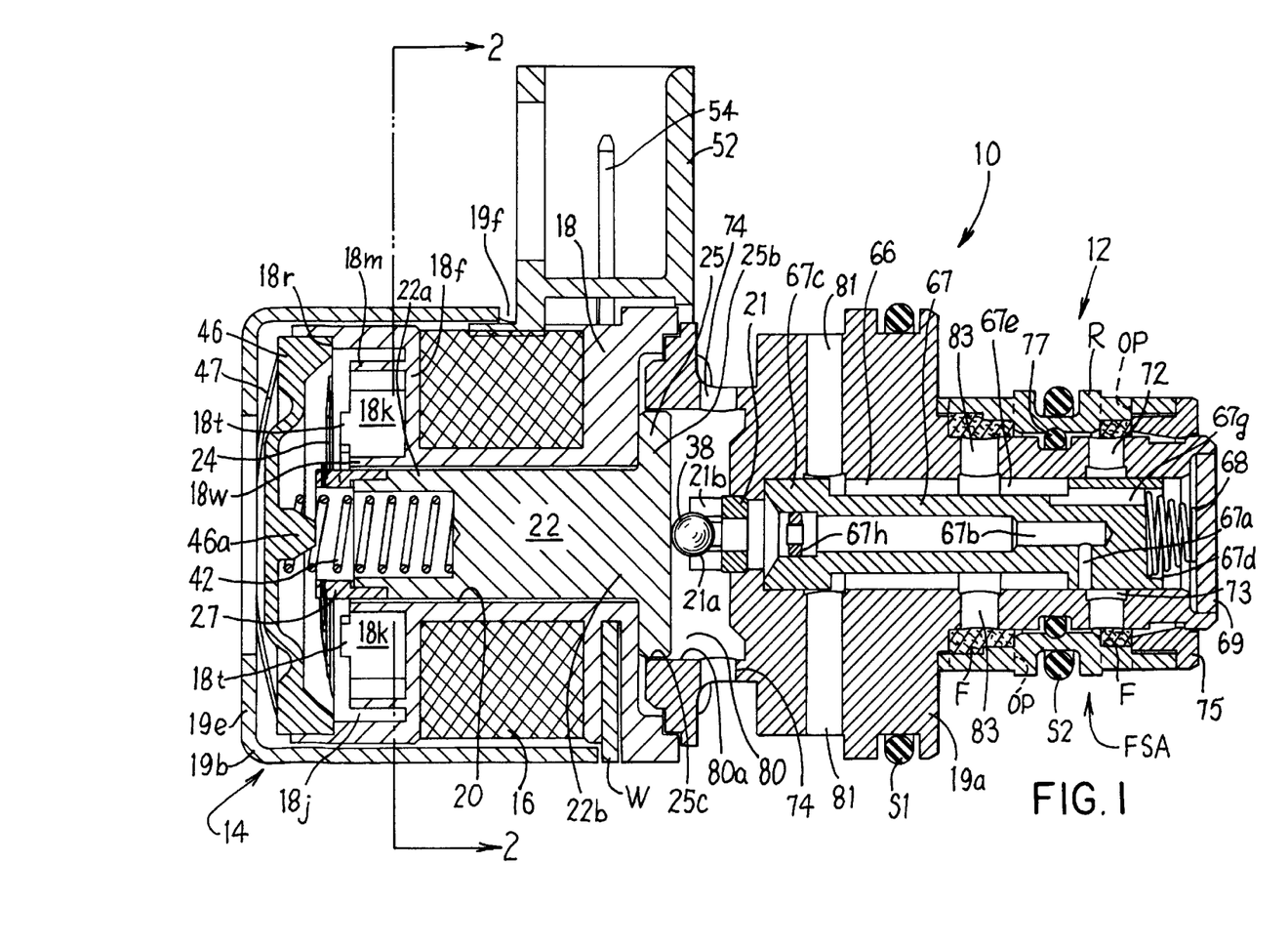
FIG. 1 is a longitudinal cross sectional view of a proportional variable force solenoid fluid control valve in accordance with one embodiment of the present invention. The view is taken along lines 1—1 of FIG. 3.
Figure 3:
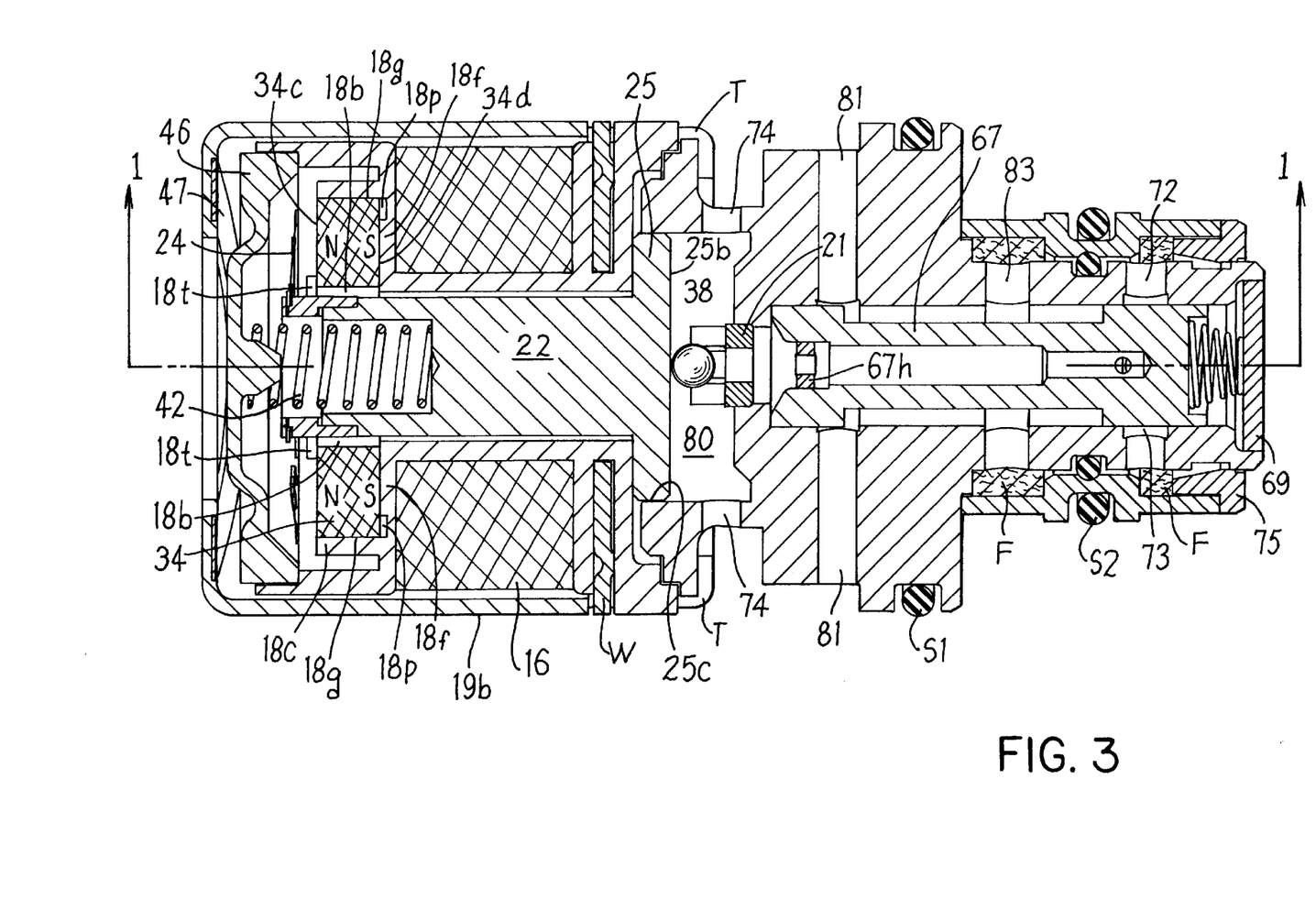
FIG. 3 is a longitudinal cross-section taken along lines 3—3 of the proportional variable force solenoid fluid control valve.

Referring to FIG. 1, a proportional variable force solenoid fluid control valve 10 includes valve member 12 and associated valve components disposed in a valve or nozzle housing 19a and a solenoid 14 disposed in a generally cylindrical solenoid housing 19b in a manner to provide a fluid control valve of the general type described in the Najmolhoda U.S. Pat. No. 4,988,074 of common assignee herewith, the teachings of which are incorporated herein by reference. The valve housing 19a can be made of aluminum, while the solenoid housing 19b can comprise steel or other ferromagnetic material pursuant to U.S. Pat. No. 4,988,074. The valve housing 19a and solenoid housing 19b can be joined together by tabs T, FIG. 3, of the solenoid housing 19b crimped over an annular shoulder of the valve housing 19a as shown in U.S. Pat. No. 4,988,074, or formed as a single, common housing, pursuant to Najmolhoda U.S. Pat. No. 5,611,370 with the common housing made of a substantially non-magnetic material with little or no magnetic permeability, the teachings of which patents are incorporated herein by reference to this end.

A material particularly suited for such a common or single housing comprises aluminum and its alloys or thermoplastic formed by casting or injection molding to required housing configuration to receive the valve member 12 and the solenoid 14. The common housing will include a housing section or region for enclosing the solenoid 14 and a nozzle housing section or region for enclosing the valve 12 and associated valve components.

Referring to FIG. 1, the solenoid 14 is disposed in the solenoid housing 19b (or solenoid housing section of the common housing embodiment) and includes an electromagnetic solenoid coil 16 wound about a cylindrical surface of molded plastic bobbin 18 which has a cylindrically shaped bore hole 20 through the longitudinal axis thereof. The bobbin 18 is made of glass filled thermoplastic. An axially elongated, generally cylindrical armature 22 formed of a ferromagnetic material (e.g. steel) is suspended within the bore hole 20 of the plastic bobbin 18 by a thin low spring rate spring 24 mounted at a rear, outermost end 22a of the armature.

The plate spring 24 is of the type described in the aforementioned Najmolhoda U.S. Pat. No. 4,988,074, the teachings of which are incorporated herein by reference. That is, the spring plate is formed from very thin non-magnetic austenitic stainless steel, such as full hard austenitic stainless steel, which provides a very low rate spring for the spring configuration shown in FIG. 5 of the aforementioned '074 patent. The inner periphery of the plate spring 24 is mounted by a non-ferrous (e.g. half hard brass) annular armature spring retainer member 25 mounted to the rear, outer end 22a of the armature 22 so as to suspend the armature 22 for free axial longitudinal movement within the bobbin 18. The opposite front, inner end 22b of the armature can be supported by a similar optional plate spring (not shown) or, the plate spring 26 may be omitted from the embodiment of FIG. 1 with the inner end 22b of the armature 22 unsupported, except by the axial periphery of a damping member 25 received in damping chamber 80 as described below.

The outer periphery of the plate spring 24 is mounted between the radially enlarged annular end flange or shoulder 18r of the coil bobbin 18 and an opposing annular end of valve housing cap or closure 46 made of aluminum alloy (e.g. Al alloy 6061 T6). The solenoid housing 19a includes an annular end flange 19e overlying the cap or closure 46 as shown with a Bellvelle wave washer 47 therebetween to accommodate stack up tolerances.

As shown in FIG. 1, a damping member 25 on the inner end 22b of the armature 22 engages a steel ball valve 38. Ball valve 38 cooperates with an annular valve seat 21a on a ball valve cage insert 21 pressed in the valve or nozzle housing 19a. The ball valve 38 and valve seat 21a define a fluid diverting valve for diverting fluid to exhaust ports 74 in a manner described below. An optional flux washer W can be provided in a recess in bobbin 18 pursuant to the aforementioned U.S. Pat. No. 4,988,074, incorporated herein by reference, to concentrate electromgantic flux at the inner end of the armature.

In accordance with an embodiment of the invention, a plurality of axially magnetized permanent magnet segments 34 (two segments shown for illustration only) each segment having an inner arcuate magnet surface 34a facing the armature 22 are present to collectively provide a permanent magnetic field that cooperates with the electromagnetic field of the energized coil 16 to move the armature 22. The permanent magnet segments 34 are disposed about the outer cylindrical periphery or surface 22e of the armature 22 in respective circumferentially spaced apart, axially extending pockets 18a of the coil bobbin 18 in a common transverse plane relative to the longitudinal axis A of movement of the armature 22 and bobbin bore hole 20. The magnet segments 34 are selected in number and circumferential length or extent of inner arcuate surfaces 34a extent to collectively encompass or overlie less than 100% of the outer cylindrical periphery or surface 22e of the armature 22 when viewed in cross-section transverse to the longitudinal axis A, see FIG. 2. Two, three, four, or more magnet segments 34 may be present to this end. Preferably, the inner arcuate surfaces 34a of the permanent magnet segments 34 collectively encompass or overlie at least about 67% of the outer armature surface 22e when viewed in transverse cross-section. More preferably, the inner arcuate surfaces 34a collectively encompass or overlie about 70 to about 80% of the outer armature surface 22e of the armature when viewed in transverse cross-section, FIG. 2.

Figure 2:
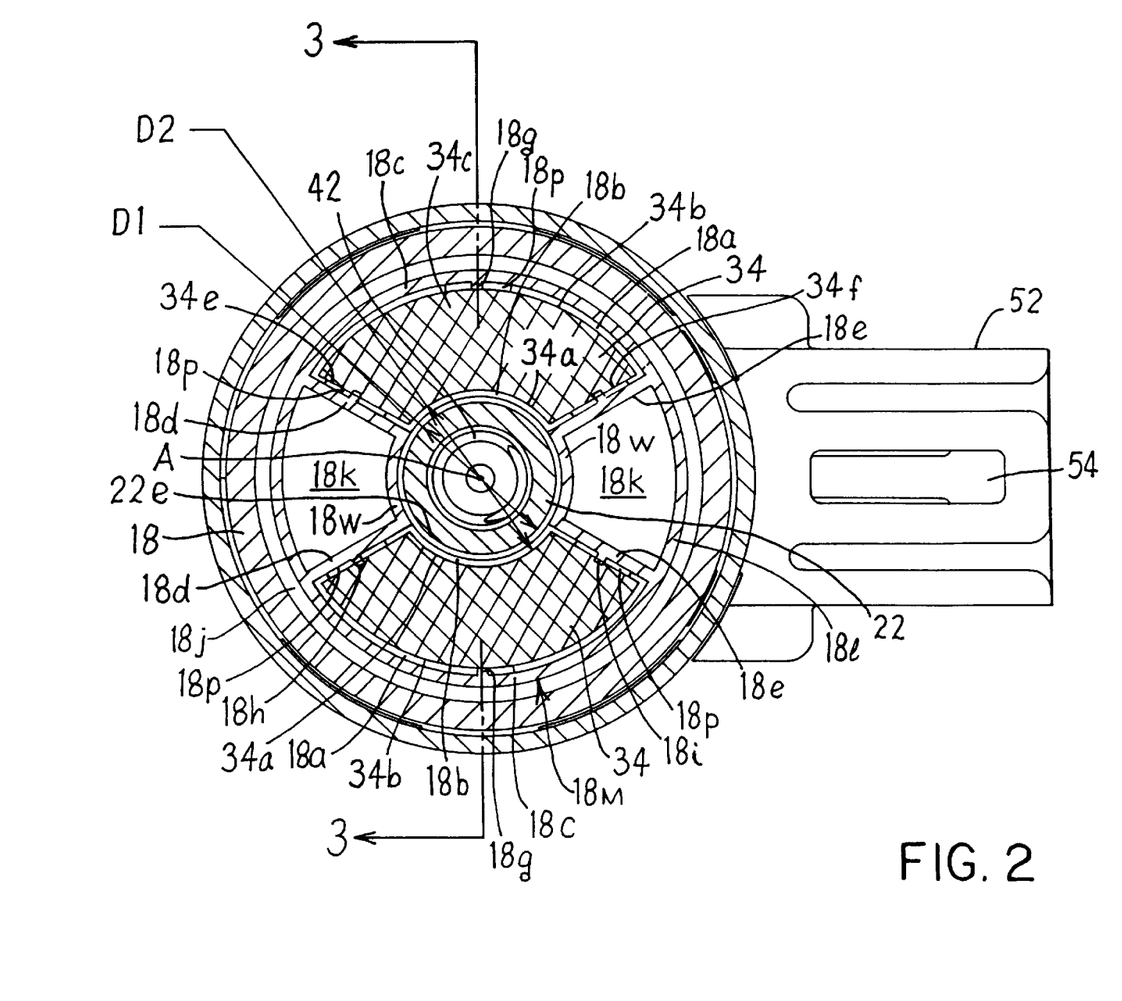
FIG. 2 is a sectional view taken along lines 2—2 of FIG. 1 of the coil bobbin with arcuate permanent magnet segments frictinally fit and heat staked in pockets in the bobbin.
Figure 4:
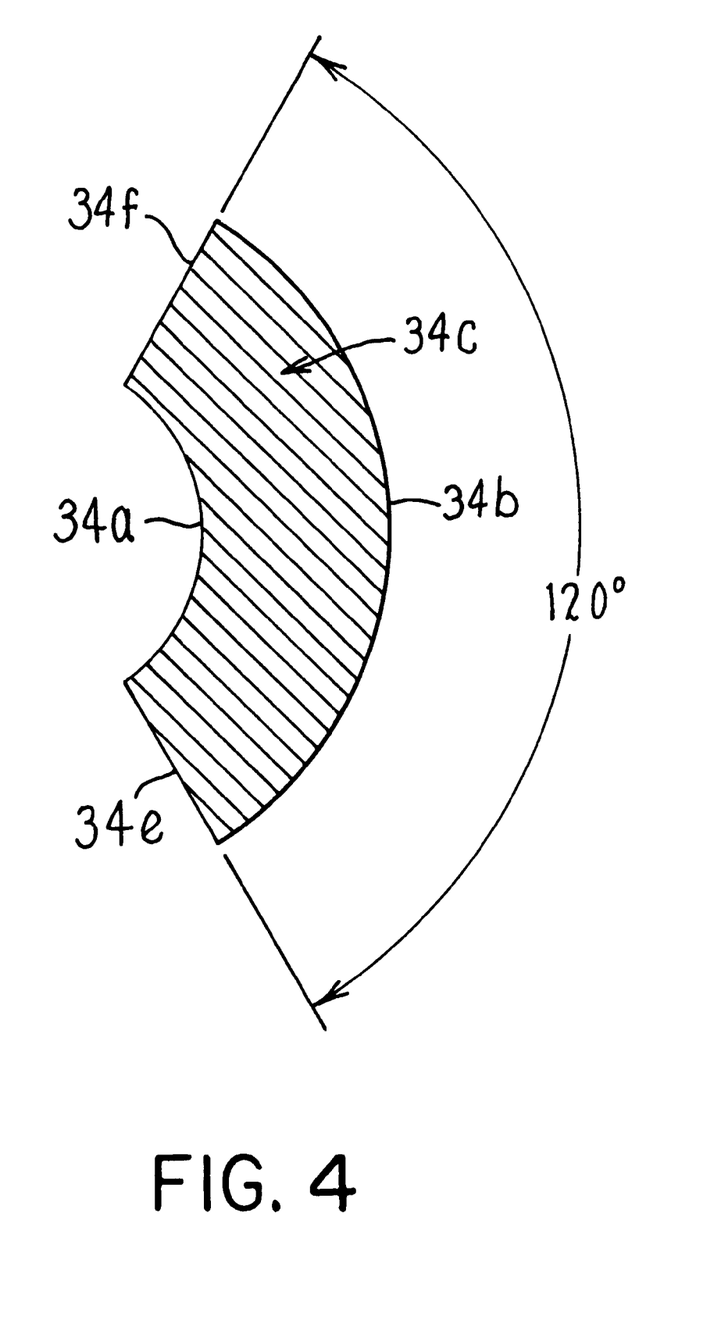
FIG. 4 is a side elevation of a permanent magnet segment.

Referring to FIGS. 2 and 4, each permanent magnet segment 34 includes inner arcuate face or surface 34a facing the outer armature surface 22e, which is formed collectively by adjacent coextensive outer surfaces of the armature 22 and armature spring retainer 25. Each segment 34 also includes an outer arcuate face or surface 34b, first and second axial side faces 34c, 34d, and first and second radially extending end faces 34e, 34f to from a generally C-shaped magnet segment. Each segment is axially magnetized between side faces 34a, 34d as indicated by the "N" and "S" magnetic pole indicia in FIG. 3 such that the axial direction of magnetization is generally parallel with the longiditudinal axis A of the armature 22.

The radially extending end faces 34e, 34f are circumferentially spaced from respective end faces of an adjacent magnet segment 34. The end faces 34e, 34f, when viewed in transverse cross-section, are disposed in radial planes that intersect the center of the armature 22 which lies on longitudnal axis A. In the embodiment shown in FIGS. 1–4, the radially extending end faces 34e, 34f define therebetween an included angle of 120 degrees about the center of the armature 22, although other angles in the range of about 90 to about 140 degrees can be used in practicing the invention. Exemplary arc lengths of the inner arcuate face 34a and outer arcuate face 34b for the aforementioned included angle of 120 degrees of FIG. 4 are 0.336 inch and 0.671 inch, respectively, with the lengths of the end faces each being 0.160 inch. The inner arcuate faces 34a of each magnet segment typcially are spaced a radial distance (nominal) of about 0.0205 inch from the outer surface 22e of the armature 22. For example, an outer diameter D1 of the armature surface 22e can be 0.280 inch, while the inner diameter D2 of the inner arcuate magnet segment surface 34a can be 0.321 inch.

The coil bobbin 18 pursuant to an embodiment of the invention includes respective axially extending, generally trapezoidal shaped (in end elevation) pockets 18a to receive each permanent magnet segment 34 with the axial side faces 34c, 34d oriented generally perpendicular to the longitudinal axis A of the armature. Each pocket 18a is defined by an inner arcuate opening 18b, an outer arcuate wall 18c and first and second radially extending end walls 18d, 18e. Each pocket includes an open outer axial end through which a respective magnet segment is inserted into the pocket and an inner axial end closed by an axial pocket end wall 18f extending generally perpendicular to the longiudinal axis A. The coil bobbin also includes an annular circumferential end groove 18j adjacent annular shoulder 18r.

Between the pockets 18a are disposed empty axially extending, generally trapezoidal shaped (in end elevation) recesses 18k. Each recess 18k includes inner arcuate wall 18w and outer arcuate wall that comprises portions of continuous circumferential walls 18m of the bobbin that also defines the outer arcuate walls 18c of the pockets 18a as evident from FIG. 2. The radially extending walls of each empty recess 18k are shared with the adjacent pocket 18a.

Each permanent magnet segment 34 is confined in its own pocket 18a and separated from adjacent magnet segments 34 by the empty recesses 18k and from the armature 22 by the inner arcuate opening 18b of the pocket. Each permanent magnet segment 34 preferably is frictionally confined in each pocket 18a by virtue of each outer arcuate face 34b and radially extending end face 34e, 34f being frictionally engaged with first, second and third axially extending locating posts 18g, 18h, 18i provided in each pocket 18a integral therewith (e.g. molded) with the outer arcuate wall 18c and radially extending end walls 18d, 18e when the magnet segment 34 is inserted into the pocket. A hemispherical recess 18p preferably is provided in the axial end wall 18f of each pocket behind the magnet segment 34, in FIG. 2, proximate the locating posts 18g, 18h, 18i to receive plastic shavings (not shown) that are removed from the axially extending locating posts 18g, 18h, 18i as the magnet segment 34 is frictionally inserted into each pocket so that the shavings do not mis-orient the magnet segment in its pocket.

The permanent magnet segments 34 are formed of rare earth permanent magnet material, such as Sm-Co or preferably $Nd_2Fe_{14}B$, permitting use of a reduced size magnet segments that result in a compact solenoid. The axially magnetized permanent magnet segments 34 collectively produce a permanent magnetic field that substantially axially saturates the armature 22 even in the absence of electrical current to the coil 16. Thus, a relatively smaller magnetic field is required to move the armature 22 between the axial position shown in FIG. 1 corresponding to a valve closed position (where ball valve 38 is seated on the valve seat 21a) and an axial position to the left in FIG. 1 corresponding to a valve open position (where ball valve 38 is unseated from the valve seat 21a).

In a method embodiment of the invention, the permanent magnet segments 34 are each positioned in a respective pocket 18a of the coil bobbin 18 so as to be disposed about the periphery of the bore hole 20 with the inner arcuate surfaces 34c collectively overlying less than 100% of the bore hole 20 and thus the armature surface 22a when viewed in cross-section transverse to the longitudinal axis A. Preferably, the permanent magnet segments 34 are inserted into each pocket such that there is frictional engagement of the outer arcuate face 34b and first and second radially extending end faces 34e, 34f of each magnet segment 34 with axially extending locating posts 18g, 18h, 18i of each pocket as each magnet segment is postioned therein. As each magnet segment is inserted, shavings removed from the bobbin posts 18g, 18h, 18i are received in the recesses 18p in the bobbin axial end wall 18f proximate the locating posts in a manner that the shavings do not mis-orient the magnet segment 34 in the pocket. After the permanent magnet segments 34 are positioned in the respective pockets 18a, they are heat stacked therein by heating and deforming portions of radial end walls 18d, 18e of bobbin 18 as heat stake tabs 18t over the magnet segments, FIGS. 1, and 3.

The ball valve 38 is received and confined laterally in a flat-sided recess or cage machined or otherwise formed in the stainless steel insert 21 between the inner end of the armature 22 and the valve seat 21a. In this valve arrangement, the ball valve 38 is biased by coil spring 42 against the armature end 22b and follows movement of the armature 22 in a direction toward or away from the valve seat 21a by virtue of the fluid pressure on the ball valve and by virtue being captured in the cage 21b.

Coil compression spring 42 (spring biasing means) is trapped in a cylindrical armature counterbore between the axial armature end 22a and a central axially extending projection 46a of the valve housing cap or closure 46. The projection 46a receives the coil spring 42 with the end of the spring 42 engaging the inner surface or wall of the cap 46. The armature 22 is biased to the valve closed position by the coil spring 42 when the solenoid coil 16 is deenergized. The cap or closure 46 includes a cylindrical outer surface received ina a cylndrical counterbore of the bobbin 18 to trap spring 24 as shown.

A plastic connector body 52 is mounted on the bobbin 18 and exits the solenoid housing 19b via a suitable opening 19f therein. Electrical contacts 54 (only one shown) extend through the bobbin 18 and through apertures in the connector body 52. Such electrical contacts 54 are shown in the aforementioned Najmolhoda U.S. Pat. No. 4,988,074. The ends of the electrical contacts 54 are connected to the wires of the electromagnetic coil 16 for receiving an electrical current signal from a variable current source (not shown).

The armature damping member 25 includes a generally flat-sided disk shaped section 25b formed on the inner armature end 22b. The armature damping member 25 comprises the ferromagnetic armature material, such as steel, to provide an improved magnetic flux carrier to direct the magnetic flux directly into the armature end 22b, while reducing size of the solenoid unit.

The disk end section 25b includes a cylindrical outer peripheral surface 25c that cooperates with cylindrical damping chamber 80 disposed in the valve or nozzle housing 19a to reduce or dampen pressure oscillations resulting from electrical, mechanical, and/or hydraulic noise in the controlled fluid system or circuit; i.e. the fluid system or circuit, such as an automatic transmission circuit, controlled by valve 12 as described in copending application Ser. No. 08/978 257, and entitled Proportional Variable Force Solenoid Control Valve With Armature Damping, of common assignee herewith. To this end, there is a controlled clearance between the outer cylindrical, peripheral surface 25c of the damping member 25 and the chamber wall 80a. The damping chamber 80 is machined or otherwise formed in the valve or nozzle housing 19a and communicates with the exhaust ports 74 (two shown with two additional exhaust ports not shown extending into and out of the plane of the drawing).

In operation in an automatic trnasmission application where the control valve is fully immersed in hydraulic trnasmission fluid, the damping chamber 80 typically will have predominantly hydraulic fluid therein, although some air may be present in the damping chamber 80.

The cross-sectional area of the damping member 25 and the clearance between the surface 25c and the cooperating wall 80a of the damping chamber 80 are selected effective to reduce or damp pressure oscillations resulting from noise in the controlled fluid system or circuit, which pressure oscillations can result in non-linear valve response performance. An exemplary cross-sectional area of the disk section 25b (cross-sectional area calculated using the outer diameter of damping member 25) can be 0.039 inch$^2$ (0.54 inch outer diameter of damping member disk section). For this exemplary cross-sectional area of the dampng member 25, an exemplary radial clearance of approximately 0.005 inch can be provided between the disk surface 25c and the chamber wall 80a for the proportional variable force solenoid fluid control valve shown in FIG. 1 adapted for use in a hydraulic automatic transmission application for controlling a gear shifting hydraulic circuit. More generally, the aforementioned radial clearance can be in the range of 0.004 to 0.0055 inch for a disk section outer diameter in the range of 0.54 to 0.542 inch and axial length of surface 25c in the range of 0.070 to 0.074 inch in a damping chamber having inner diameter of 0.550 to 0.551 inch to provide a damping area in the range of 0.0003 to 0.0004 inch$^2$.

In effect, the damping chamber 80 and the damping member 25 provide a trapped volume of fluid comprising predominantly hydraulic fluid which must be moved through the restricted clearance area between the surface 25c and the wall 80a and in doing so reduces or damps pressure oscillations resulting from electrical, mechanical, and/or hydraulic noise in the controlled fluid system or circuit.

The valve or nozzle housing 19a includes a longitudinal passageway 66 having a generally cylindrical configuration for receiving an aluminum alloy spool 67 (e.g. Al alloy 6262) which is received in the passageway 66 in a close fit, sliding manner at spool end regions for axial reciprocable movement.

The housing 19a is disposed in a bore or chamber (not shown) in a cast aluminum transmission body (not shown) or other fluid control system. Outer O-ring seals S1, S2 on the valve housing 19a seal on the transmission housing and separate the supply and control lines or conduits (not shown) of the transmission hydraulic circuit.

The valve housing 19a includes a pressurized fluid supply or inlet port 72, a plurality of control ports 83, a plurality of first exhaust ports 81 associated with the control ports, and a plurality of second exhaust ports 74 associated with the ball valve 38. The valve housing 19a includes the damping chamber 80 communicated with the ball valve 38 and in turn the respective exhaust ports 74. These ports can be cast, machined or otherwise formed in the valve housing 19a. The control ports 83, exhaust ports 81, and exhaust ports 74 are spaced circumferentially about the nozzle section 19a. Typically, two control ports 83, four exhaust ports 81, and four exhaust ports 74 are provided on the valve housing 19a. A tubular fluid filter screen assembly FSA is held on the nozzle housing 19a by retainer 75 and sealed thereto by O-ring 77. The assembly includes filter screens F overlying the inlet and control ports 72, 83 as shown to permit fluid flow through overlying openings OP in the filter support ring R and prevent entry of harmful dirt and debris particles that may be present in the fluid. The filter screens F are carried on the support ring R.

The inlet port 72 communicates with an annular chamber 73 that, in turn, is in communication with a radial fluid passage 67a of the spool 67. Passage 67a communicates with a longitudinal central passage 67b of the spool 67 having an orifice plug 67h press fit therein.

The slidable spool valve 67 is disposed in the valve housing 19a to provide a two stage operation wherein, in the first stage, pressurized fluid is supplied to the inlet or supply port 72 with the end 67c of the spool valve abutted against housing stop end wall (proximate insert 21) as shown in FIG. 1 as biased by spring 68 and with the ball valve 38 seated against the valve seat 21a with no electrical current to the coil 16. Spring 68 abuts an end closure 69. As a result, the entering fluid flow is caused to bypass the control ports 83 and instead is directed to flow through spool passages 67a, 67b and orifice plug 67h to the axial fluid passage of valve insert 21. The ball valve 38 initially is seated on the valve seat 21a by virtue of the force of the coil spring 42. The position of the spool valve 67 corresponding to a minimum fluid flow spool valve position relative to the control ports 83 occurs when the annular spool control land 67e is not communicated to the inlet port 72. However, once the fluid reaches valve seat 21, fluid pressure increases to a level that moves the spool valve 67 to the right in FIG. 1 against spring 68 sufficiently to communicate the annular control land 67e to the inlet port 72 with exhaust ports 81 closed. This position of the spool valve 67 corresponds to a maximum fluid flow spool valve position relative to the control ports 83 wherein the annular spool control chamber is communicated to the inlet port 72. Commnication of the spool control land 67e with the inlet port 72 also communicates the end 67d of the spool valve 67 to the control pressure port 83 via the passage 67g. Thus, when the steady state flow conditions are realized, the opposite ends of the spool valve 67 are subjected to equal fluid pressure.

Thereafter, a second stage of operation involves controlling the fluid flow through the control ports 83 by spool valve movement between the aforementioned minimum and maximum flow spool positions. Movement of the spool valve is controlled by diverting fluid from the valve seat 21a out through the exhaust ports 74 to vary fluid pressure in a linear proportional manner. For example, electrical current is supplied to the coil 16 via the contacts 54 to create an electromagnetic field which, in addition to the permanent magnet field of permanent magnet segments 34 and force of fluid pressure on the ball valve 38, overcomes the coil spring 42 and slight force of spring plate 24 to move the armature 22 in a linear proportional manner to the current level applied to coil 16. Since the ball valve 38 moves with the armature 22, the ball valve 38 will open in linear proportional manner to the current applied to the coil 16 and divert fluid out of the exhaust ports 74 to unbalance fluid pressure on the spool valve member ends to control the spool valve position in linear proportional manner between the aforementiond minimum and maximum fluid flow spool positions relative to the control ports 83 and exhaust ports 81 of the valve housing 19a. This provides a controlled fluid flow out of the control ports 83 in direct proportion to the opening of the ball valve 38 in accordance with linear movement of the armature 22 which, in turn, is directly proportional to the amount of electrical current supplied to the coil 16 of the solenoid 14.

Such axial spool movement as described herebove provides a negative gain mode of fluid flow control wherein there is a linear decrease in fluid pressure at the control ports 80 in proportion to an increase in electrical current to the coil 16. However, a positive gain mode of fluid flow control also can be achieved by the proportional variable force fluid control valve 10 described by reversing the flow of electrical current in the coil 16 and by introducing supply pressure through the inlet port 72 with the ball valve 38 in the full open position as determined by the position of the armature 22 with current flowing in the coil 16 as described in aforementioned U.S. Pat. No. 5,611,370.

Regardless of whether the proportional variable force solenoid control valve 10 is operated in a positive or negative gain mode, the armature disk 25 and damping chamber 80 will cooperate to reduce or dampen fluid pressure oscillations resulting from electrical, mechanical, and/or hydraulic noise in the controlled fluid system or circuit, which pressure oscillations, in turn, can result in non-linear valve response behavior. In an electronically controlled automobile transmssion application, electromechanical noise in the controlled system or circuit can originate in the transmission control module (e.g. a chopped pulse width control signal) and oscillations of the clutch or shift valves in the transmission body and produce fluid pressure oscillations and a non-linear valve response.

Although certain preferred embodiments of the proportional variable force solenoid valve and fluid control device for an electronic transmission of the invention have been shown and described in detail, it should be understood that variations or modifications may be made without departing from the spirit or scope of the present invention.

We claim:

1. In a proportional variable force solenoid valve for controlling the pressure of a fluid in a fluid control system, a housing having therein a solenoid coil disposed on a coil bobbin, an armature movable in response to electrical current applied to the solenoid coil, means for biasing the armature in a direction to establish a valve fluid pressure response to solenoid coil current, and a plurality of axially magnetized permanent magnet segments each having an inner magnet surface facing the armature and collectively providing a permanent magnetic field that cooperates with the electromagnetic field of the energized coil to move the armature, said permanent magnet segments being disposed about the periphery of the armature in respective peripherally spaced apart pockets of the coil bobbin in a common transverse plane relative to the longitudinal axis of movement of the armature, said magnet segments being selected in number and inner magnet surface length to collectively encompass or overlie less than 100% of the peripheral surface of the armature when viewed in cross-section transverse to the longitudinal axis.

2. The control valve of claim 1 wherein the inner magnet surface lengths of said permanent magnet segments collectively encompass at least about 67% when viewed in transverse cross-section.

3. The control valve of claim 2 wherein the inner magnet surface lengths of said permanent magnet segments collectively encompass about 70% to about 80% of the peripheral surface of the armature when viewed in transverse cross-section.

4. The control valve of claim 1 wherein each permanent magnet segment includes an inner arcuate surface facing the armature and an outer arcuate surface, first and second axial side faces, and first and second radially extending end faces to form a generally C-shaped magnet segment, each segment being axially magnetized between said side faces.

5. The control valve of claim 4 wherein the radially extending end faces are cicumferentially spaced from respective end faces of an adjacent magnet segment, said end faces, when viewed in transverse cross-section, being disposed in radial planes that intersect the center of the armature.

6. The control valve of claim 4 wherein the coil bobbin includes respective axially extending pockets to receive each permanent magnet segment with the axial side faces oriented generally perpendicular to the longitudinal axis of movement of the armature, each pocket being defined by an inner arcuate opening, an outer arcuate wall and first and second radially extending end walls and including an open outer axial end through which a respective magnet segment is inserted into the pocket and an inner axial end closed by an axial pocket wall extending generally perpendicular to the longiudinal axis.

7. The control valve of claim 6 wherein each magnet segment is confined in its own pocket and separated from adjacent magnet segments by the radially extending end walls of the pocket and from the armature by the inner arcuate opening of the pocket.

8. The control valve of claim 7 wherein each magnet segment is frictionally confined in each pocket.

9. The control valve of claim 8 wherein each permanent magnet segment is frictionally confined by the radially extending end faces of the magnet segment frictionally engaging first and second axially extending locating posts provided in each pocket proximate the radially extending end walls when the segment is inserted into the pocket.

10. The control valve of claim 9 wherein a recess is provided in the axial wall of each pocket proximate the junction of the axial wall and each radially extending end wall to receive plastic shavings that are removed from the locating posts as the magnet segment is frictionally inserted into each pocket so that the shavings do not mis-orient the magnet segment in the pocket.

11. A coil bobbin and permanent magnet assembly for a solenoid, comprising a surface on which a solenoid coil is disposed about a longitudinal armature-receiving bore and a plurality of circumferentially spaced apart, axially extending pockets in the coil bobbin disposed in a common transverse plane relative to the longitudinal axis of said bore, and a plurality of axially magnetized permanent magnet segments each having an inner magnet surface facing said bore and collectively providing a permanent magnetic field that cooperates with an electromagnetic field of said coil, said permanent magnet segments being disposed in said pockets about the periphery of the bore and being being selected in number and inner magnet surface length to collectively overlie less than 100% of said bore when viewed in cross-section transverse to the longitudinal axis.

12. The assembly of claim 11 wherein the inner magnet surface length of said permanent magnet segments collectively encompass about 70% to about 80% of said bore when viewed in transverse cross-section.

13. The assembly of claim 11 wherein each permanent magnet segment includes an inner arcuate surface facing the armature and an outer arcuate surface, first and second axial side faces, and first and second radially extending end faces to form a generally C-shaped magnet segment, each segment being axailly magnetized between said side faces.

14. The assembly of claim 13 wherein the radially extending end faces are cicumferentially spaced from the end faces of an adjacent magnet segment, said end faces, when viewed in transverse cross-section, being disposed in radial planes that intersect the center of said bore.

15. The assembly of claim 13 wherein the coil bobbin includes respective axially extending pockets to receive each permanent magnet segment with the axial side faces oriented generally perpendicular to the longitudinal axis of movement of the armature, each pocket being defined by an inner arcuate opening, an outer arcuate wall and first and second radially extending end walls and including an open outer axial end through which a respective magnet segment is inserted into the pocket and an inner axial end closed by an axial pocket wall extending generally perpendicular to the longitudinal axis.

16. The assembly of claim 13 wherein each magnet segment is confined in its own pocket and separated from adjacent magnet segments by the end walls of the pocket and from the armature by the inner arcuate opening of the pocket.

17. The assembly of claim 16 wherein each magnet segment is frictionally confined in each pocket.

18. The assembly of claim 17 wherein each permanent magnet segment is frictionally confined by the radially extending end faces of the magnet segment frictionally engaging first and second axially extending locating posts provided in each pocket proximate the radially extending end walls when the segment is inserted into the pocket.

19. The assembly claim 18 wherein a recess is provided in the axial wall of each pocket behind the magnet segment proximate the junction of the axial wall and each radially extending end wall to recieve plastic shavings that are removed from the locating posts as the magnet segment is frictionally inserted into each pocket so that the shavings do not mis-orient the magnet segment in the pocket.

20. A coil bobbin, comprising a surface on which a solenoid coil is disposed about a longitudinal armature-receiving bore and a plurality of circumferentially spaced apart, axially extending magnet-receiving pockets in the coil bobbin disposed in a common transverse plane relative to the longitudinal axis of said bore, each said pocket having an inner opening facing said bore, an outer arcuate wall, first and second radially extending end walls, an open outer axial end through which a respective axially magnetized magnet can be inserted into the pocket, and an inner axial end closed by an axial pocket wall extending generally perpendicular to the longitudinal axis.

21. The bobbin of claim 20 wherein each pocket further includes first and second axially extending locating posts provided in each pocket proximate the radially extending end walls.

22. The bobbin of claim 21 wherein a recess is provided in the axial wall of each pocket proximate the junction of the axial wall and each radially extending end wall to receive plastic shavings that are removed from the locating posts as a magnet segment is frictionally inserted into each pocket so that the shavings do not mis-orient the magnet segment in the pocket.

23. A method of assembling a solenoid having an armature and a wire oil disposed on a bobbin having a longitudinal armature-receiving bore, comprising forming a plurality of peripherally spaced apart pockets in the coil bobbin disposed in a common transverse plane relative to the longitudinal axis of said bore, providing a plurality of axially magnetized permanent magnet segments each having an inner magnet surface for facing said bore, and positioning said permanent magnet segments in respective pockets about the periphery of the bore such that the inner magnet surfaces collectively overlie less than 100% of said bore when viewed in cross-section transverse to the longitudinal axis.

24. The method of claim 23 includng frictionally engaging axially extending end surfaces of each magnet segment with axially extending end walls of a respective pocket as each magnet segment is postioned in each pocket.

25. The method of claim 23 including collecting any shavings removed from said bobbin in a recess in said bobbin as each magnet segment is postioned in each pocket in a manner that the shavings do not mis-orient said magnet segment in said pocket.

* * * * *